United States Patent
Chapman et al.

(10) Patent No.: US 11,617,371 B2
(45) Date of Patent: Apr. 4, 2023

(54) DOUGH PRESS

(71) Applicant: FRESHLINK PRODUCT DEVELOPMENT, LLC, New York, NY (US)

(72) Inventors: Dean Chapman, Montclair, NJ (US); Michael Dicocco, Sparta, NJ (US)

(73) Assignee: FRESHLINK PRODUCT DEVELOPMENT, LLC, New York, NY (US)

( * ) Notice: Subject to any disclaimer, the term of this patent is extended or adjusted under 35 U.S.C. 154(b) by 78 days.

(21) Appl. No.: 17/373,290

(22) Filed: Jul. 12, 2021

(65) Prior Publication Data
US 2023/0009369 A1  Jan. 12, 2023

(51) Int. Cl.
*A21C 11/00* (2006.01)

(52) U.S. Cl.
CPC .................................. *A21C 11/006* (2013.01)

(58) Field of Classification Search
CPC ............... A21C 11/004; A21C 11/006; B29C 2043/366; B29C 33/308; B29C 2043/3639; B29C 45/376; B30B 1/04; A63H 33/001
See application file for complete search history.

(56) References Cited

U.S. PATENT DOCUMENTS

| | | | | |
|---|---|---|---|---|
| 756,639 A | * | 4/1904 | Hutchison | B29C 43/50 425/422 |
| 1,459,976 A | * | 6/1923 | Gore | A21C 11/16 425/409 |
| 1,937,290 A | * | 11/1933 | Mears | A21C 11/006 425/401 |
| 1,991,588 A | * | 2/1935 | Waterman | A21C 11/006 425/398 |
| 3,190,758 A | * | 6/1965 | Hauf | A21C 11/004 426/394 |
| 3,352,258 A | * | 11/1967 | Lassaulx | A21B 5/03 425/89 |
| 3,671,008 A | * | 6/1972 | Villalba, Jr. | A22C 7/0046 425/374 |
| 3,880,064 A | * | 4/1975 | Martinez | A47J 37/0611 219/524 |
| 5,074,778 A | * | 12/1991 | Betts, Jr. | B30B 15/022 425/383 |
| 5,413,472 A | * | 5/1995 | Dietterich | B29C 33/303 425/188 |
| 5,417,149 A | * | 5/1995 | Raio | A21B 5/00 100/319 |

(Continued)

*Primary Examiner* — Emmanuel S Luk
(74) *Attorney, Agent, or Firm* — Muncy, Geissler, Olds & Lowe, P.C.

(57) ABSTRACT

A dough press includes a handle and a press unit that includes a base seat, a lower press-plate and an upper press-plate. The base seat has a first recess sub-unit and a second recess sub-unit, each having at least one recess. A depth of the at least one recess of the second recess sub-unit is different from that of the at least one recess of the first recess sub-unit. The lower press-plate has an engaging sub-unit removably engaged with the at least one recess of a selected one of the first and second recess sub-units. The handle is pivotable relative to the base seat to drive pivot movement of the upper press-plate toward the lower press-plate, thereby compressing and flattening a dough.

7 Claims, 7 Drawing Sheets

(56) References Cited

U.S. PATENT DOCUMENTS

| | | | | |
|---|---|---|---|---|
| 6,010,325 | A * | 1/2000 | Lawrence | A21C 11/006 425/437 |
| 6,067,897 | A * | 5/2000 | Grieco | A21C 11/004 425/367 |
| 6,205,914 | B1 * | 3/2001 | McCarney | A21C 11/006 99/376 |
| 6,242,027 | B1 * | 6/2001 | Grieco | A21C 5/00 426/503 |
| 6,332,768 | B1 * | 12/2001 | Raio | A21C 11/006 425/408 |
| 6,386,854 | B1 * | 5/2002 | Guss | A21C 9/066 425/408 |
| 6,769,898 | B1 * | 8/2004 | Voyatzakis | A21C 11/006 426/496 |
| 9,648,986 | B1 * | 5/2017 | Byrne | A21C 11/008 |
| 9,913,481 | B2 * | 3/2018 | McCarney | A21C 11/006 |
| 10,667,526 | B2 * | 6/2020 | Zapata | A21C 11/006 |
| 2004/0009256 | A1 * | 1/2004 | Voyatzakis | A21C 11/006 425/404 |
| 2008/0276810 | A1 * | 11/2008 | Ceja | A21C 9/085 99/485 |
| 2017/0347669 | A1 * | 12/2017 | McCarney | A21C 11/006 |
| 2019/0343132 | A1 * | 11/2019 | Zapata | A21C 11/006 |

\* cited by examiner

DOUGH PRESS

FIELD

The disclosure relates to a press that can be used to process food, and more particularly to a dough press that can be used to flatten dough.

BACKGROUND

Flattening dough is a very important step used in the preparation of a wide variety of different foods, for example, dumplings, baozi, or tortillas. However, flattening pieces of dough by hand is labor intensive and inefficient. Additionally, it is particularly difficult to achieve a consistent thickness of the dough when flattening the dough manually.

SUMMARY

Therefore, an object of the disclosure is to provide a dough press that can alleviate at least one of the drawbacks of the prior art.

According to the disclosure, the dough press includes a press unit and a handle. The press unit includes a base seat, a lower press-plate, and an upper press-plate. The base seat has a first recess sub-unit that has at least one recess facing upwardly, and a second recess sub-unit that has at least one recess facing upwardly. A depth of the at least one recess of the second recess sub-unit is different from that of the at least one recess of the first recess sub-unit. The lower press-plate is adapted for supporting a dough thereon, and has an engaging sub-unit that is removably engaged with the at least one recess of a selected one of the first and second recess sub-units of the base seat, such that a height position of the lower press-plate relative to the base seat is adjustable. The upper press-plate is pivotally connected to the base seat. The handle is connected to the base seat and is pivotable relative to the base seat to drive pivot movement of the upper press-plate relative to the base seat toward the lower press-plate, thereby compressing and flattening the dough between the upper and lower press-plates.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
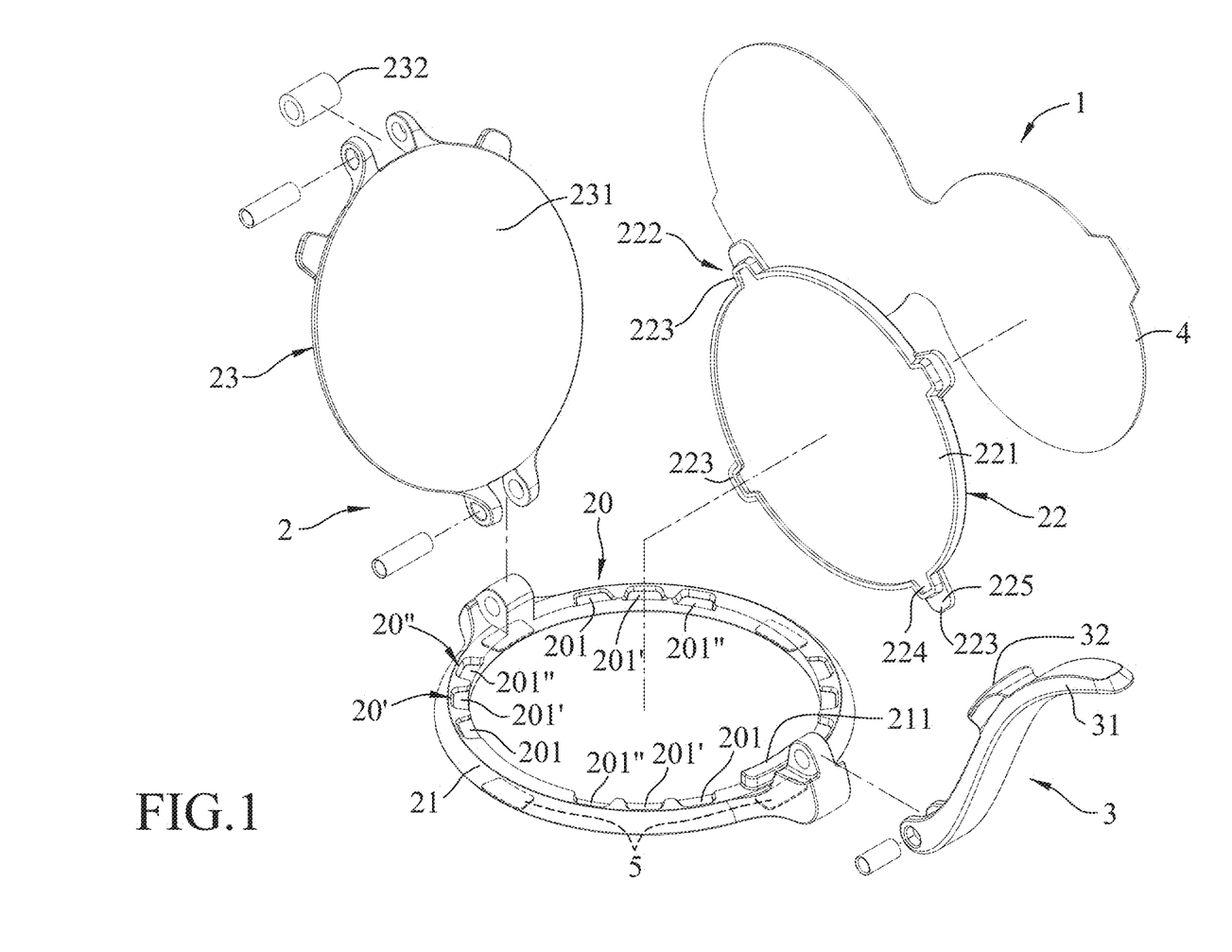
FIG. 1 is an exploded perspective view illustrating an embodiment of a dough press according to the disclosure.
Figure 2:
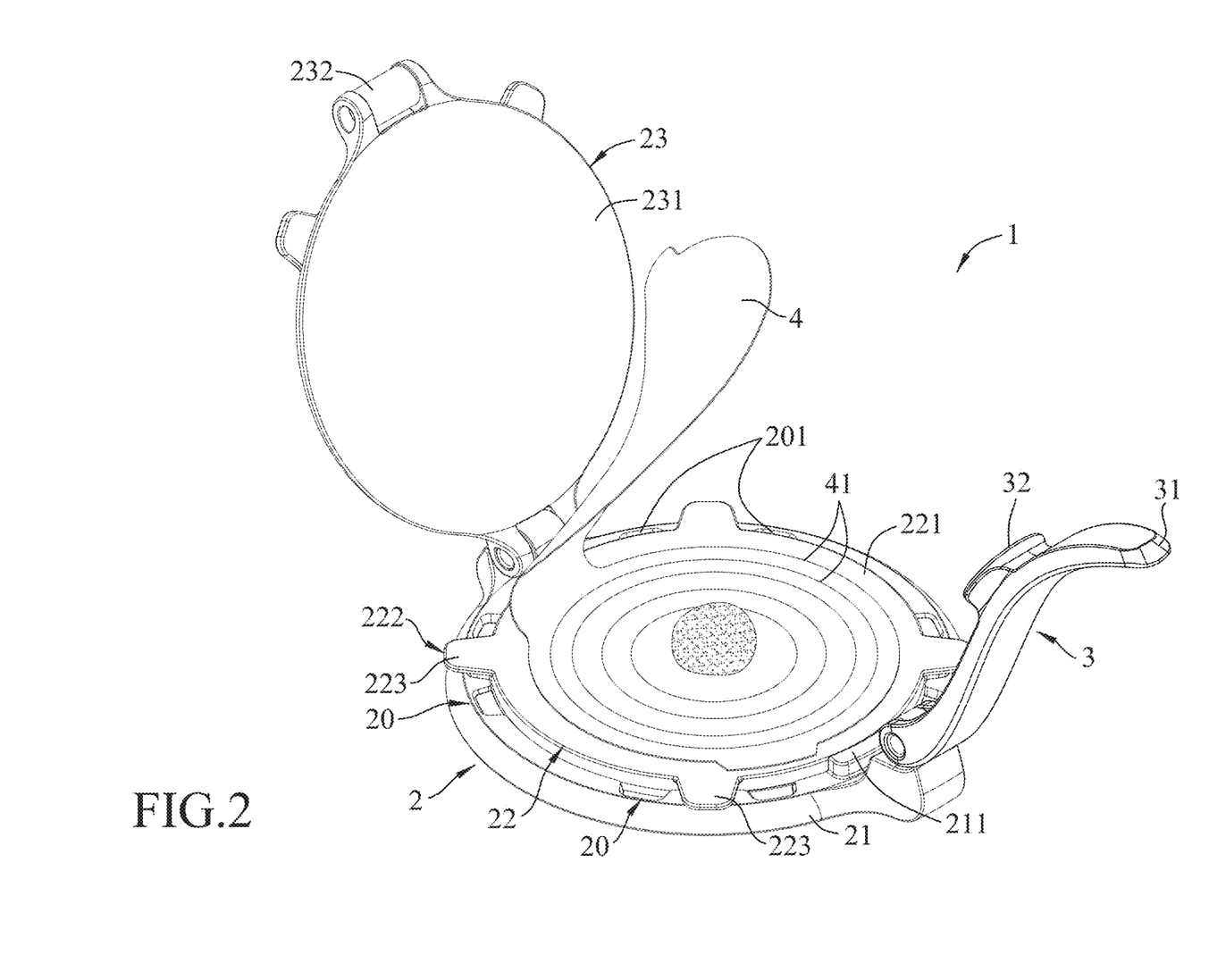
FIG. 2 is an assembled perspective view illustrating the embodiment.
Figure 3:
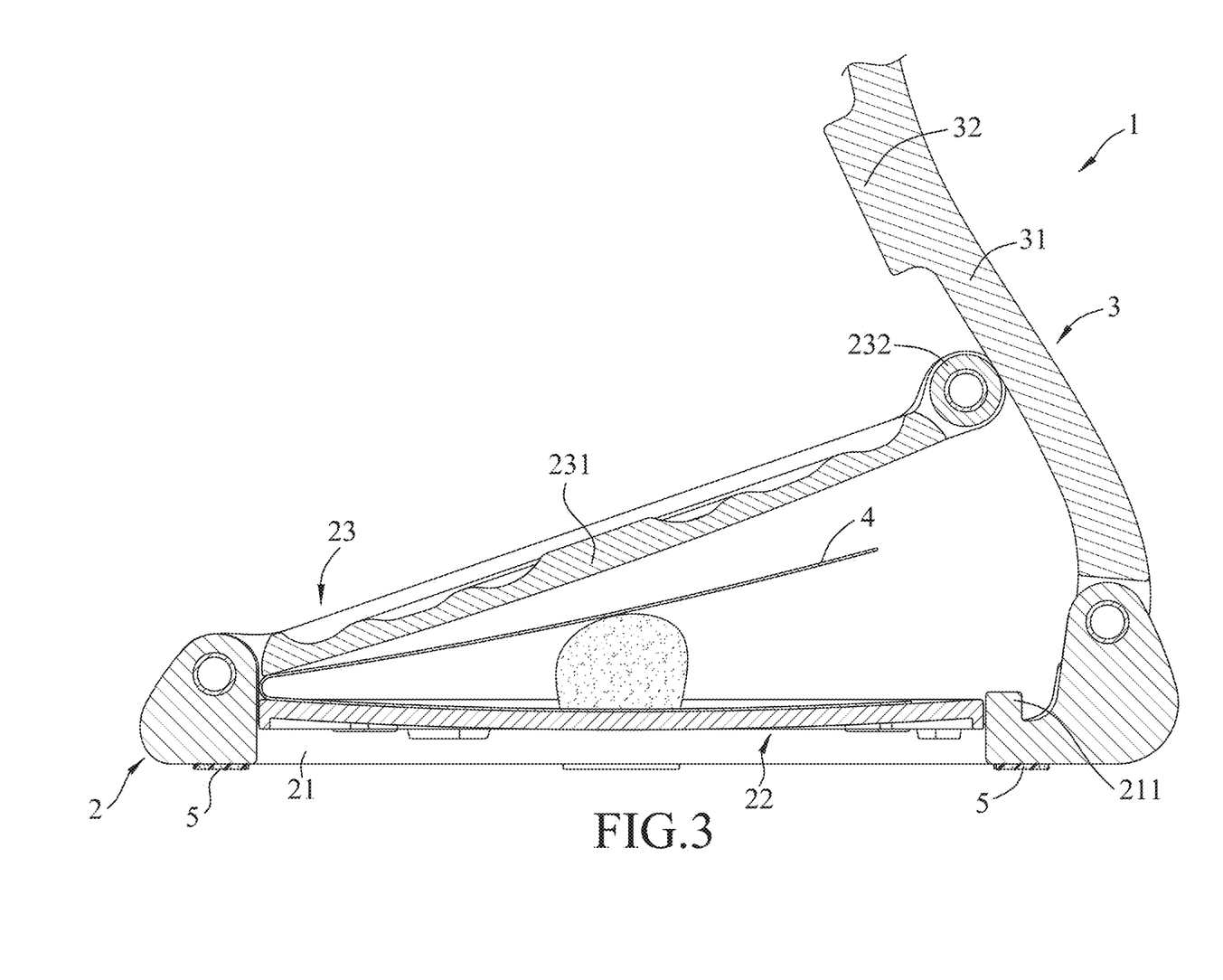
FIG. 3 is a fragmentary sectional view illustrating the embodiment.
Figure 4:
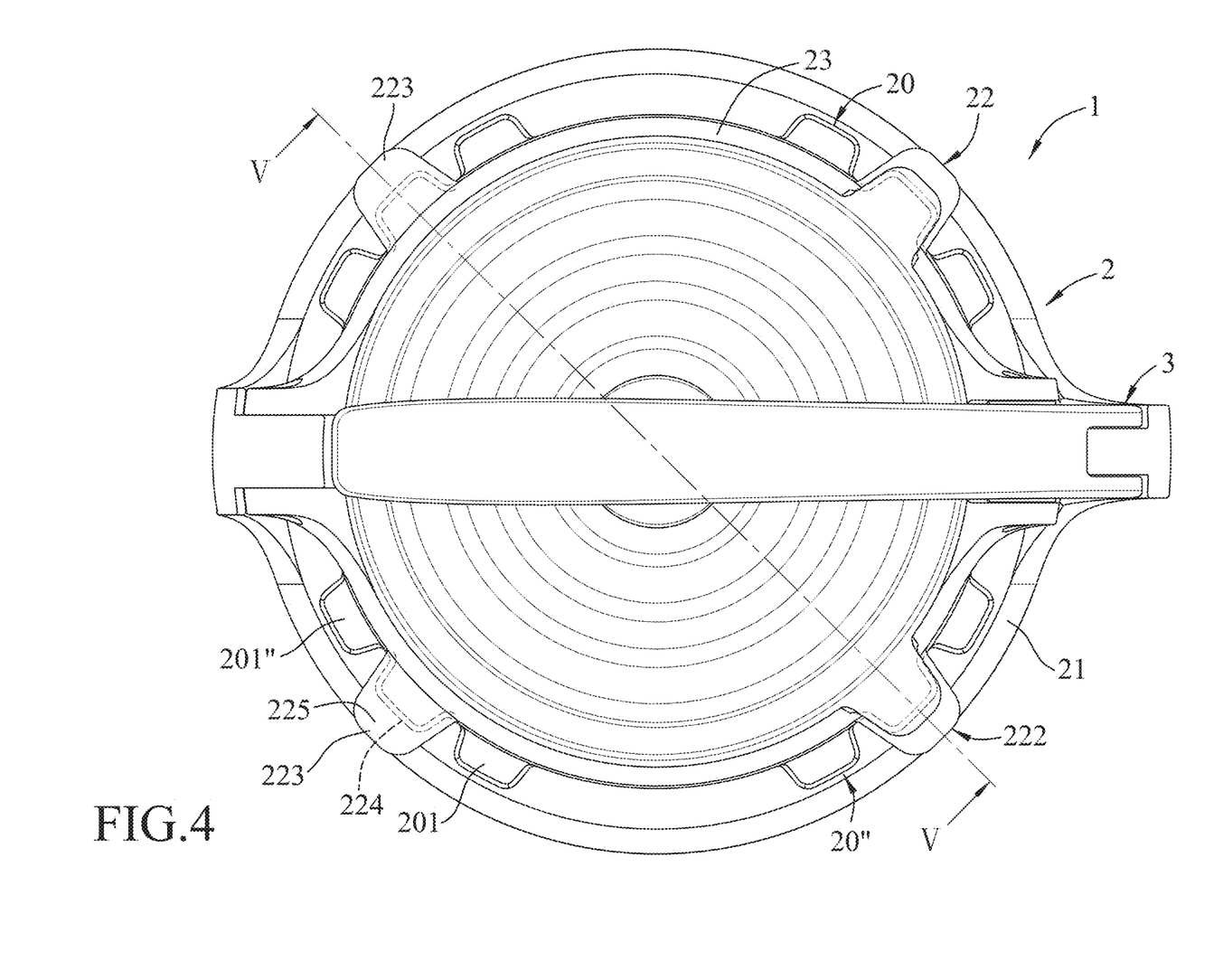
FIG. 4 is a top view of the embodiment, illustrating two engaging blocks of a lower press-plate engaging with a recess sub-unit of a base unit of a press unit.

Referring to FIGS. 1 to 3, an embodiment of the dough press 1 is shown. The dough press 1 is adapted to press and flatten a dough. The dough may be a wheat dough used, for example, in pita bread or a maize dough used, for example, for making tortillas. However, the dough press 1 in this disclosure is not limited to being used on a particular type of dough; the dough press 1 may be used to flatten any dough, regardless of the type of flour the dough is made from. The dough press 1 includes a press unit 2, a handle 3, an anti-stick padding 4, and a plurality of anti-slip pads 5.

The press unit 2 includes a base seat 21, a lower press-plate 22, and an upper press-plate 23.

The base seat 21 is ring-shaped, and has a positioning block 211 and a first recess sub-unit 20, a second recess sub-unit 20', and a third recess sub-unit 20". In this embodiment, the first recess sub-unit 20 has a plurality of angularly spaced-apart recesses 201 facing upwardly, the second recess sub-unit 20' has a plurality of angularly spaced-apart recesses 201' facing upwardly, and the third recess sub-unit 20" has a plurality of angularly spaced-apart recesses 201" facing upwardly. The recesses 201, 201' 201" are formed on an outer surface of the base seat 21.

In this embodiment of the dough press 1, the recesses 201' of the second recess sub-unit 20' has a depth that is different from that of the recesses 201 of the first recess sub-unit 20, and the recesses 201" of the third recess sub-unit 20" has a depth that is different from the recesses 201 of the first recess sub-unit 20 and different from the recesses 201' of the second recess sub-unit 20'. In this embodiment, the lower press-plate 22 is adapted for supporting the dough thereon, and has a lower press-plate body 221 that is disk-shaped, and an engaging sub-unit 222 that is removably engaged with the recesses 201, 201', 201" of a selected one of the first, second and third recess sub-units 20, 20', 20" of the base seat 21, such that a height position of the lower press-plate 22 relative to the base seat 21 is adjustable.

The engaging sub-unit 222 includes a plurality of engaging blocks 223 that extend from a periphery of the lower press-plate body 221 and that are removably engaged with the recesses 201, 201', 201" of the selected one of the first, second and third recess sub-units 20, 20', 20". More specifically, each engaging block 223 has a protruding portion 225 that extends from the periphery of the lower press-plate body 221 and that abuts against the outer surface of the base seat 21, and an engaging portion 224 that extends downwardly from the protruding portion 225 and that engages with a respective recess 201, 201', 201" of the selected one of the first, second and third recess sub-units 20.

The upper press-plate 23 has an upper press-plate body 231 pivotally connected to the base seat 21, and a rotating member 232 attached to the upper press-plate body 231. The handle 3 has a grip section 31 that is connected to the base seat 21 and that is pivotable relative to the base seat 21, and a projecting section 32 that projects from the grip section 31.

The pivot action of the handle 3 is capable of driving pivot movement of the upper press-plate 23 relative to the base seat 21 toward the lower press-plate 22, thereby compressing and flattening the dough between the upper and lower press-plates 22, 23. Specifically, the rotating member 232 is rotatable along the handle 3 during operation of the handle 3 to drive the pivot movement of the upper press-plate 23 relative to the base seat 21 toward the lower press-plate 22.

The anti-stick padding 4 is disposed between the upper press-plate 23 and the lower press-plate 22, and is adapted for containing the dough when the dough is being flattened. The anti-stick padding 4 has a circular scale 41 that has a plurality of concentric markings that may be used to measure the flattened dough's diameter. In this embodiment of the dough press 1, the anti-stick padding 4 is a sheet like material that can be wrapped around the dough. The anti-slip pads 5 are disposed on a bottom end of the base seat 21 and prevent the dough press 1 from sliding during use.

The dough press 1 in this embodiment is used to flatten the dough according to a method described below: placing the lower press plate 22 on top of the base seat 21 with the engaging blocks 223 respectively engaging with the recesses 201, 201', 201" of the selected one of the first, second or third recess sub-units 20, 20', 20"; layering the anti-slip padding 4 over a top surface of the lower press-plate 22 as shown in FIG. 2; placing the dough at the center of the concentric markings of the circular scale 41 of the anti-stick padding 4; folding the anti-slip padding 4 over the dough so that the anti-slip padding 4 covers and contains the dough; pivotoing the upper-press plate 23 towards the base seat 21; and finally, pivoting the handle 3 relative to the base seat 21 to drive the pivoting movement of the upper press-plate 23 via the contact between the rotating member 232 and the handle 3 to thereby compress the dough in cooperation with the lower press-plate 22.

Figure 5:
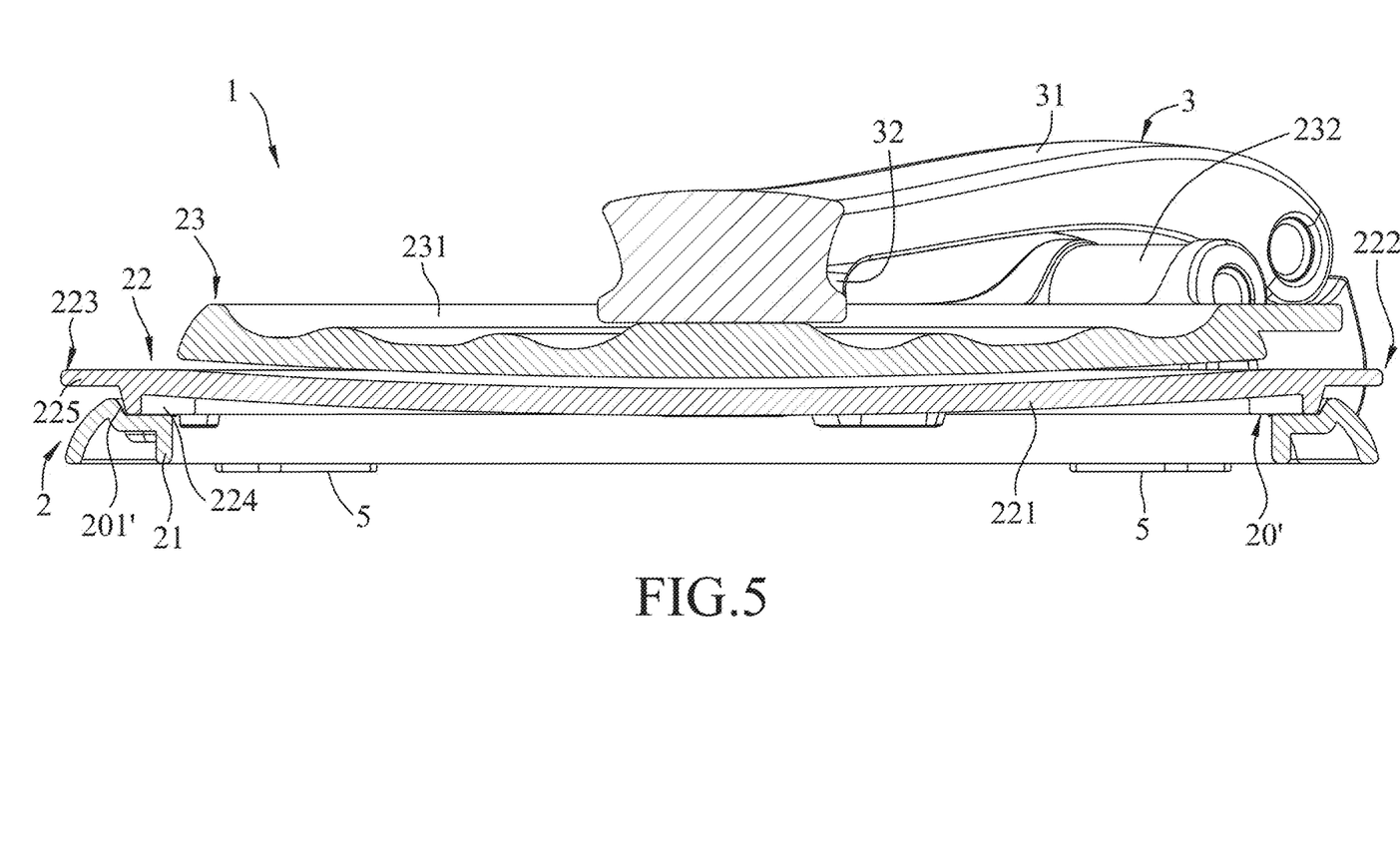
FIG. 5 is a cross-sectional view of the embodiment taken along line V-V in FIG. 4.
Figure 6:
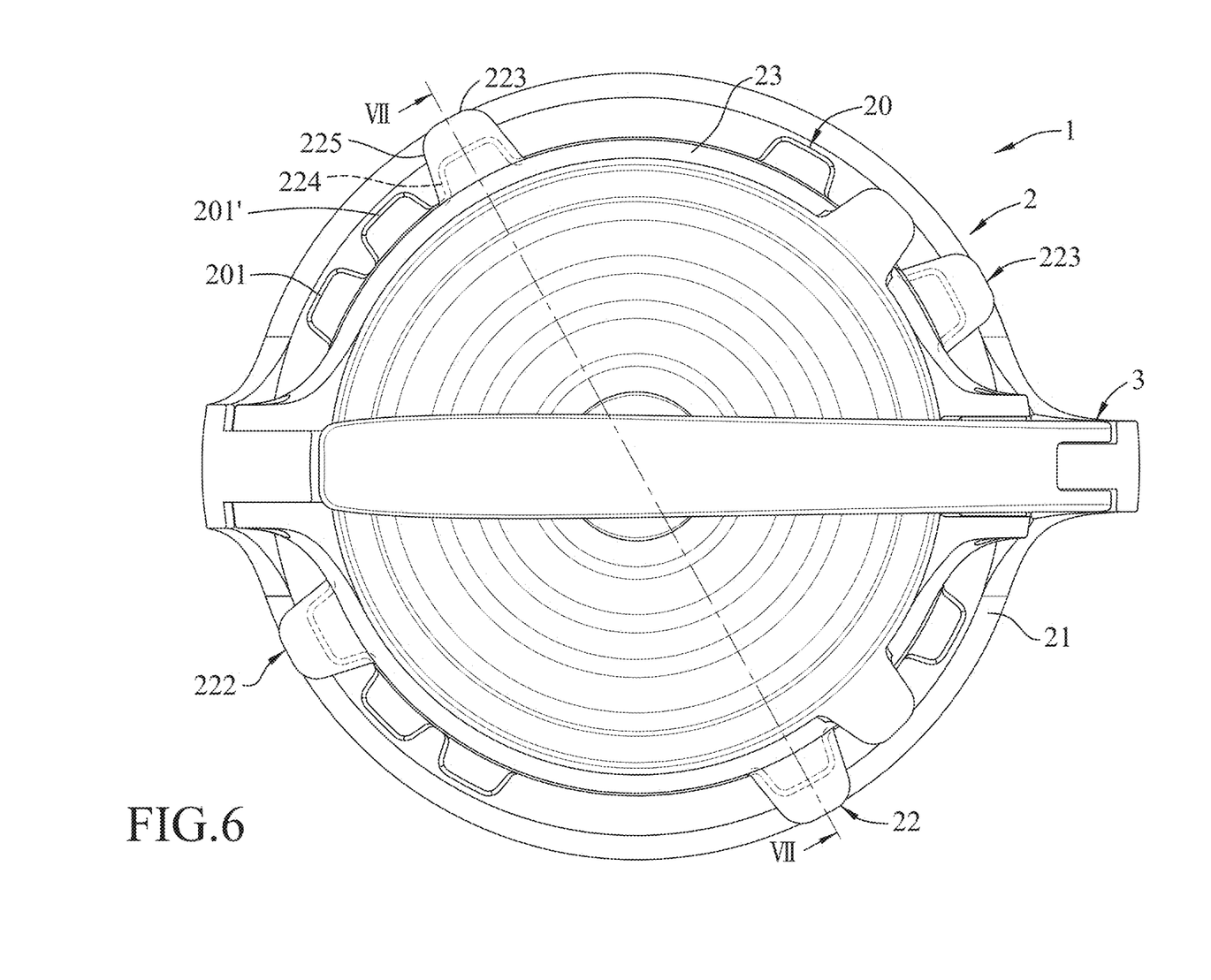
FIG. 6 is another top view of the embodiment, illustrating the two engaging blocks engaging with another recess sub-unit of the base unit of the press unit.
Figure 7:
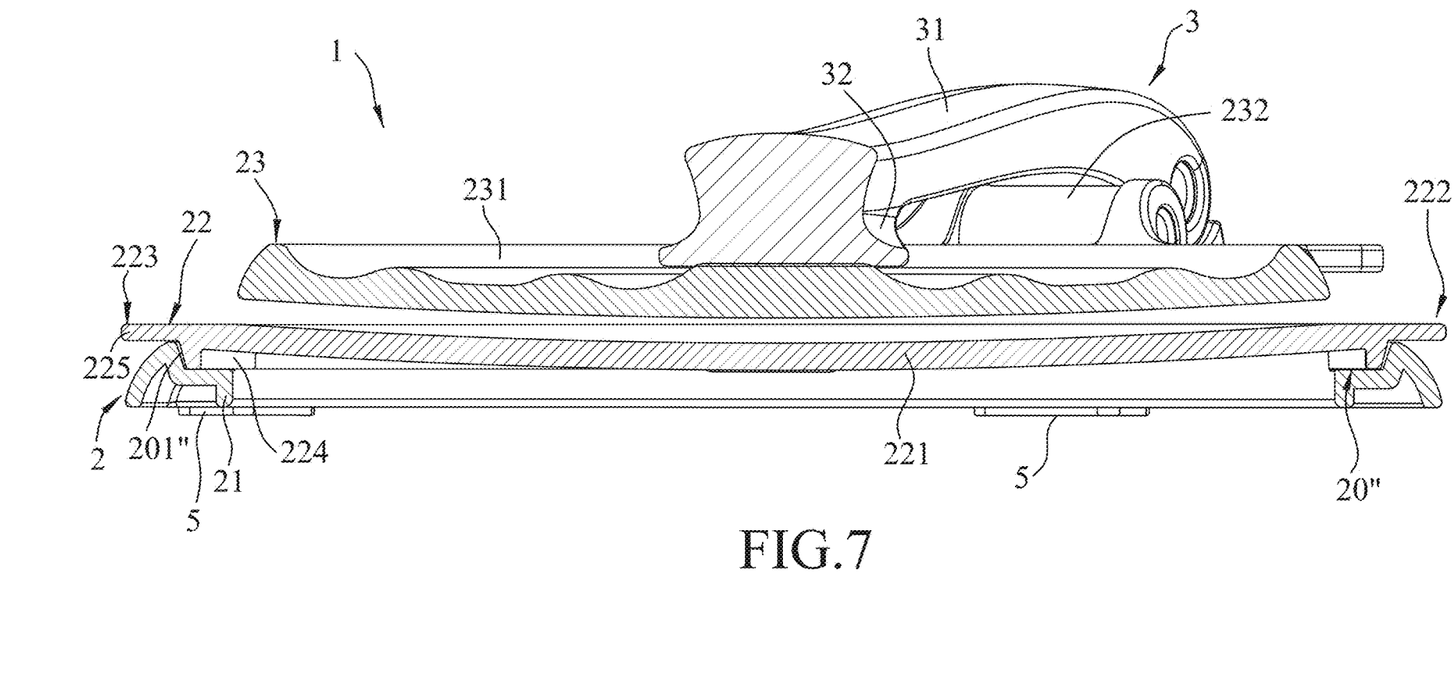
FIG. 7 is a cross-sectional view of the embodiment taken along line VII-VII in FIG. 6.

When a user of the dough press 1 compresses the dough via the handle 3 and the upper press-plate 23, the projecting section 32 of the handle 3 abuts against and presses a top surface of a central region of the upper press-plate body 231 (see FIG. 5) so that downwardly force exerted by the user is distributed evenly, and the upper press-plate 23 is able to exert a steady compressing force on the dough so that when the user finishes the compression of the dough, the flattened dough has a uniform thickness.

The dough compression continues with the rotating member 232 being rotated along the handle 3 until it reaches the positioning block 211 and abuts against the positioning block 211. At this point, the upper press-plate 23 reaches its lowest position relative to the base seat 21 and can be lowered no further. The compression of the dough is now finished, and the handle 3 can be lifted from the upper press-plate 23 for permitting removal of the compressed and flattened dough with a uniform thickness.

Referring to FIGS. 4 to 7, in this embodiment, when the user of the dough press 1 wishes to change the thickness of the flattened dough, the user may detach the lower press-plate 22 from the base seat 21 to disengage the engaging blocks 223 from the recesses 201, 201', 201" of the selected one of the first, second, and third recess subunits 20, 20', 20", and re-attach the lower press-plate 22 to the base seat 20 to engage the engaging blocks 223 with the recesses 201, 201' 201" of another one of the first, second, and third recess sub-units 20, 20', 20". Because the first, second, and third recess sub-units 20, 20', 20" have corresponding recesses 201, 201', 201" of different depths, the relative distance between the upper press-plate 22 and the lower press-plate 23 may be adjusted by using the abovementioned method.

The dough press 1 according to this disclosure allows the user to expend less effort when flattening dough by designing the handle 3 to provide the user with leverage when compressing the dough. Additionally the rotating member 232 being rotated along the handle 3 during the pivoting movement of the handle 3 reduces friction between the rotating member 232 and the handle 3 and helps to lessen the user's physical exertion when flattening dough.

It should be noted that, in this embodiment there are three recess sub-units 20, 20', 20"; however, there is no limitation on the number of recess sub-units the base seat 21 may have.

In this embodiment of the dough press 1 the anti-stick padding 4 is included; however, the anti-stick padding 4 is not a mandatory element of the dough press 1 and may not be included in other embodiments of the dough press 1.

In summary of the above, the leverage of the handle 3 lessens the physical exertion of the user. Additionally, the engaging subunit 222 of the lower press-plate 22 can be removably engaged with one of the recess sub-units 20, 20', 20", so that the distance of the lower press-plate 22 relative to the base seat 21 can be changed. Furthermore, the contact between the rotating member 232 of the upper press-plate 23 and the handle 3 can reduce friction therebetween during the operation of the dough press 1. Therefore, this disclosure discloses a dough press 1 that has multiple advantages and is easy to operate.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A dough press comprising:
a press unit that includes
a base seat having
a first recess sub-unit that has at least one recess facing upwardly, and
a second recess sub-unit that has at least one recess facing upwardly, a depth of said at least one recess of said second recess sub-unit being different from that of said at least one recess of said first recess sub-unit,
a lower press-plate adapted for supporting a dough thereon, and having an engaging sub-unit that is removably engaged with said at least one recess of a selected one of said first and second recess sub-units of said base seat, such that a height position of said lower press-plate relative to said base seat is adjustable, and
an upper press-plate pivotally connected to said base seat; and
a handle that is connected to said base seat and that is pivotable relative to said base seat to drive pivot movement of said upper press-plate relative to said base seat toward said lower press-plate, thereby compressing and flattening the dough between said upper and lower press-plates.
2. The dough press as claimed in claim 1, wherein:
said base seat is ring-shaped;

said at least one recess of each of said first and second recess sub-units has a plurality of angularly spaced-apart recesses that are formed on an outer surface of said base seat;

said lower press-plate further has a lower press-plate body that is disk-shaped; and said engaging sub-unit includes a plurality of engaging blocks that extend from a periphery of said lower press-plate body, and that are removably and respectively engaged with said recesses of said selected one of said first and second recess sub-units.

3. The dough press as claimed in claim 1, wherein said upper press-plate has an upper press-plate body pivotally connected to said base seat, and a rotating member attached to said upper press-plate body, and is rotatable along said handle during operation of said handle to drive the pivot movement of said upper press-plate relative to said base seat toward said lower press-plate.

4. The dough press as claimed in claim 1, wherein said handle has:

a grip section connected to said base seat and pivotable relative to said base seat; and a projecting section projecting from said grip section, and pressed against said upper press-plate when said upper press-plate compresses the dough.

5. The dough press as claimed in claim 1, further comprising an anti-stick padding disposed between said upper press-plate and said lower press-plate and adapted for containing the dough when the dough is being flattened.

6. The dough press as claimed in claim 5, wherein said anti-stick padding has a circular scale having a plurality of concentric markings.

7. The dough press as claimed in claim 1, further comprising a plurality of anti-slip pads disposed on a bottom end of said base seat.

* * * * *